United States Patent [19]
Sekine et al.

[11] Patent Number: 5,548,663
[45] Date of Patent: Aug. 20, 1996

[54] MULTI-COLOR MARKER EDITING SYSTEM

[75] Inventors: Hiroshi Sekine; Kazuyasu Sasuga; Kazuman Taniuchi; Yasuhiko Iwamoto; Yoshihiro Terada; Kiyomasa Endoh, all of Kanagawa, Japan

[73] Assignee: Fuji Xerox Co., Ltd., Tokyo, Japan

[21] Appl. No.: 882,137

[22] Filed: May 13, 1992

[30] Foreign Application Priority Data

May 14, 1991 [JP] Japan ................................. 3-109182

[51] Int. Cl.⁶ ............................................. G06K 9/36
[52] U.S. Cl. .......................... 382/164; 382/167; 382/175; 358/453; 358/538
[58] Field of Search ............................. 382/17, 61, 167, 382/162, 163, 275, 164, 200, 175; 358/75, 80, 452, 453, 538, 520, 518, 451

[56] References Cited

U.S. PATENT DOCUMENTS

| | | | |
|---|---|---|---|
| 3,560,930 | 2/1971 | Howard | 382/56 |
| 4,538,182 | 8/1985 | Saito et al. | 382/57 |
| 4,841,361 | 6/1989 | Matsunawa | 358/538 |
| 4,937,662 | 6/1990 | Matsunawa et al. | 358/461 |
| 4,991,223 | 2/1991 | Bradley | 382/17 |
| 5,031,035 | 7/1991 | Abe | 358/80 |
| 5,053,867 | 10/1991 | Yamamoto et al. | 358/75 |
| 5,130,791 | 7/1992 | Abe | 358/452 |
| 5,138,465 | 8/1992 | Ng et al. | 358/467 |
| 5,161,213 | 11/1992 | Knowlton | 395/128 |
| 5,241,609 | 8/1993 | Hasebe et al. | 358/453 |

FOREIGN PATENT DOCUMENTS

| | | |
|---|---|---|
| 64-80165 | 3/1989 | Japan. |
| 2-25861 | 1/1990 | Japan. |
| 2-249358 | 10/1990 | Japan. |
| 2-249359 | 10/1990 | Japan. |
| 2-249357 | 10/1990 | Japan. |
| 2-249354 | 10/1990 | Japan. |

*Primary Examiner*—Joseph Mancuso
*Assistant Examiner*—Jon Chang
*Attorney, Agent, or Firm*—Finnegan, Henderson, Farabow, Garrett & Dunner, L.L.P.

[57] ABSTRACT

A multi-color marker editing system for editing a color image by reading a designated marker. The multi-color marker editing system includes an image reading unit for reading color image data, a color-coordinate converting unit for converting the read image data into color data in a color coordinate system defined by optical density, hue and saturation, a color detecting unit for detecting a designated marker color from the read color image data, an image density converting unit for converting a density of the detected marker color image data, and a marker editing unit for making a marker color editing for each color to the density-converted marker color image data.

6 Claims, 14 Drawing Sheets

BLUE MARKER

BLUE

RED MARKER

RED

FIG. 13(a)
| 0 | 0 | 0 | 0 | 0 | 0 | 0 | 0 | 0 |
|---|---|---|---|---|---|---|---|---|
| 0 |   |   |   |   |   |   |   | 0 |
| 0 |   |   |   |   |   |   |   | 0 |
| 0 |   |   |   |   |   |   |   | 0 |
| 0 |   |   |   | 1 | 1 |   |   | 0 |
| 0 |   |   |   | 1 | 1 |   |   | 0 |
| 0 |   |   |   |   |   |   |   | 0 |
| 0 |   |   |   |   |   |   |   | 0 |
| 0 | 0 | 0 | 0 | 0 | 0 | 0 | 0 | 0 |
FIG. 13(b)
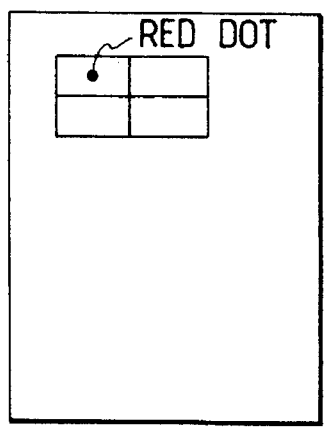
FIG. 13(c)
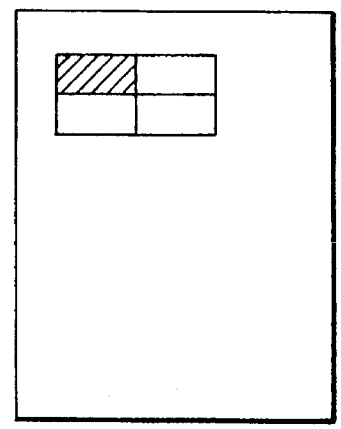

MULTI-COLOR MARKER EDITING SYSTEM

BACKGROUND OF THE INVENTION

1. Field of the Invention

The present invention relates to a multi-color marker editing system for detecting a marker that has been designated to edit.

2. Discussion of the Related Art

In a color image processing apparatus, e.g., a color copying machine, a color image on an original document is read and separated into three color image data signals. The color image is stored in the form of the color image data. Various types of processings such as magnification/reduction and partial color change processing are applied to the color image data. The partial color change processing means an image editing process in which image data inside or outside an image area that has been designated is recorded in the color used for the area designation, for example.

To be more specific, when an image area A is designated with a blue marker as shown in FIG. 1(a), the image is recorded in the color used for the area designation as shown in FIG. 1(b). When an area B is designated by a red marker as shown in FIG. 1(c), the image on the area other than the designated area is painted out with the red color used for the area designation. To detect the marker color, the color original is illuminated with light, and the reflected light therefrom is read by the combination of a lens and R, G and B sensors. The refractive index of the lens is different for colors. As a result, color ghost is generated, possibly leading to mistaken recognition of colors. To cope with this, there is a proposal having the function to correct the color ghost (Japanese Patent Unexamined Publication No. Hei. 2-25861).

The conventional marker detection uses color signals R, G and B or Y, M, and C. Because of this, the color detection accuracy is unsatisfactory, possibly causing the mistaken recognition of colors. In this respect, an additional processing for the color ghost correction is required. The processing often suffers from noise. Further, use of only one-color marker loop for one original is allowed in the conventional system. Accordingly, the conventional system cannot meet such a demand that markers of a plurality of colors are designated to a single original, and the color change processings are used for the respective colors. Further, since the conventional system makes the marker editing process while reading image data, the system cannot process complicated figures.

SUMMARY OF THE INVENTION

The present invention has been made in view of the above circumstances and has an object to provide a multi-color marker editing system which can make a color editing process by designating specific areas with multi-color markers, and can process complicated figures.

In order to attain the above object, the present invention provides a multi-color marker editing system for editing a color image by reading a designated marker, comprising: image reading means for reading color image data; color-coordinate converting means for converting the read image data into color data in a color coordinate system defined by optical density, hue and saturation; color detecting means for detecting a designated marker color from the read color image data; image density converting means for converting a density of the detected marker color image data; and marker editing means for making a marker color editing for each color to the density-converted marker color image data.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIGS. 13(a) through 13(c) are explanatory diagrams for explaining the generation of an area dot signal.

DETAILED DESCRIPTION OF THE PREFERRED EMBODIMENT

A color image processing apparatus to which a multi-color marker editing system according to the present invention is applied will be described with reference to FIGS. 2 through 4. In the description to follow, a color copying machine will be used as the color image processing apparatus.

The mechanical construction of the color copying machine will first be described with reference to FIG. 2.

Figure 1A:
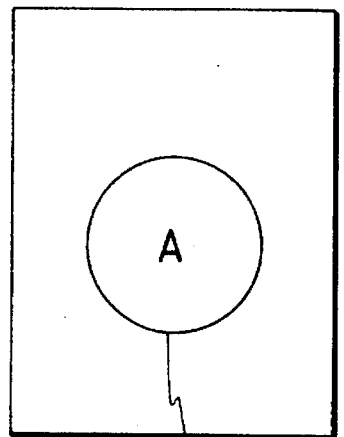
FIGS. 1(a) through 1(d) are explanatory diagrams for explaining a partial color change processing.
Figure 1B:
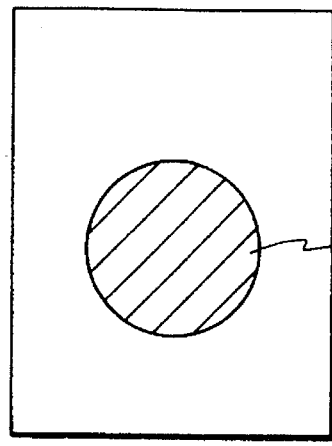
Figure 1C:
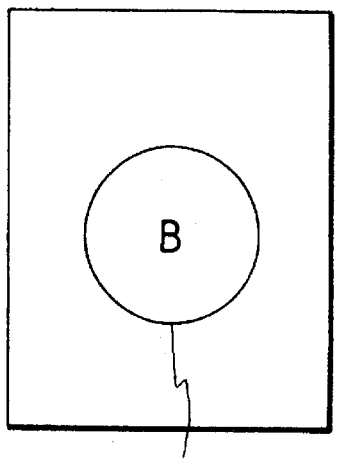
Figure 1D:
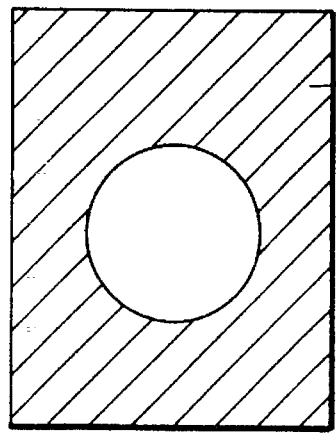
Figure 2:
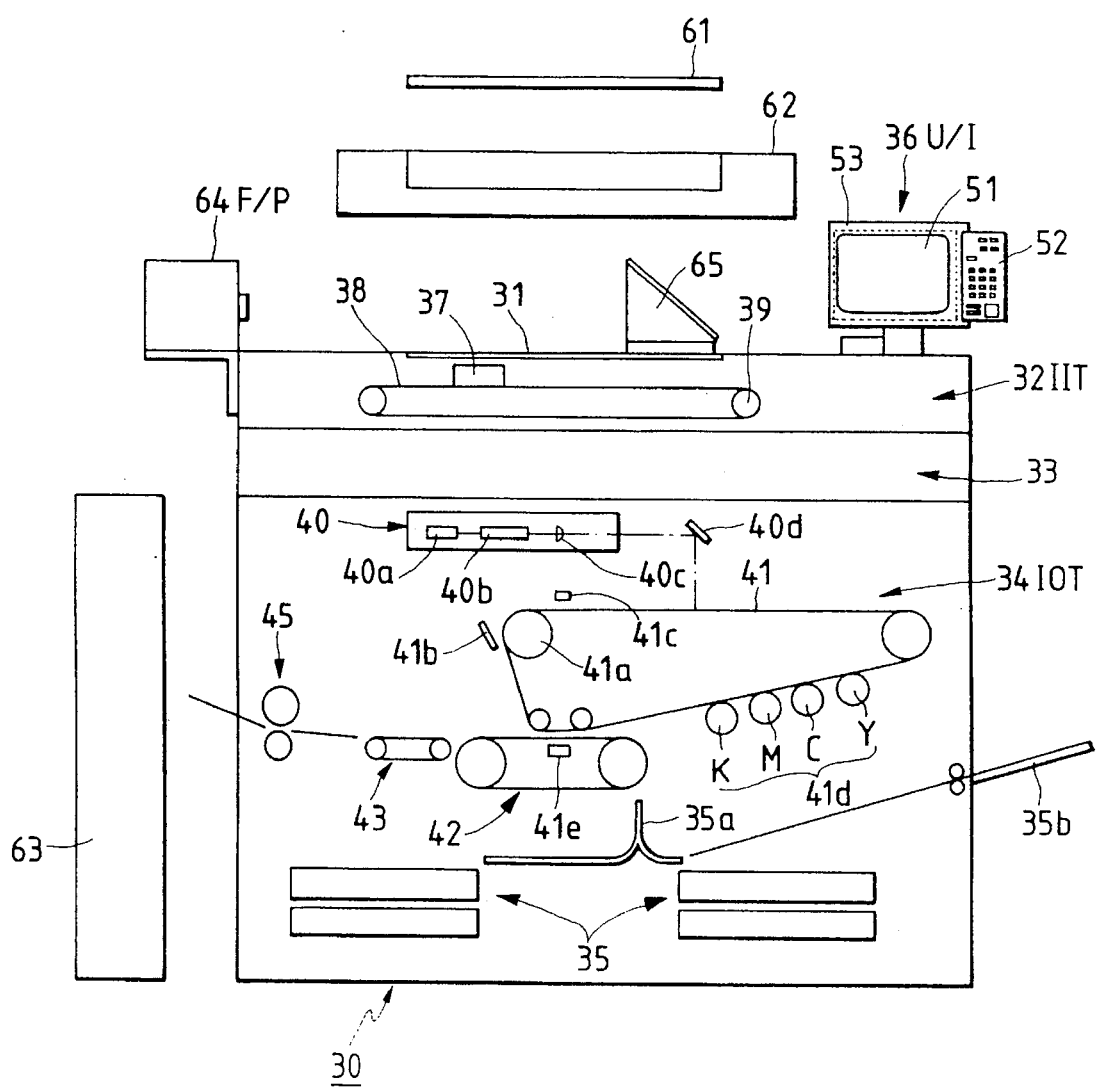
FIG. 2 is a sectional view showing a mechanical construction of a color copying machine to which a multi-color marker editing system according to the present invention is applied.

In the color copying machine shown in FIG. 2, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an editing pad 61, an automatic document feeder (ADF) 62, a sorter 63, and a film image reader having a filter projector (F/P) 64 and a mirror unit (M/U) 65.

The IIT 32 includes an imaging unit 37, a wire 38 for driving the imaging unit 37, drive pulleys 39, and the like. In the IIT 32, a color image on a color original document is separated into three primary colors B (blue), G (green), and R (red) by means of filters within the imaging unit 37, and is read by a CCD line sensor. The image data thus obtained is converted into multi-tone digital image signals B, G and R, and output to an image processing system. The image processing system, contained in the electric-control-board container 33, receives B, G and R image signals, applies various types of conversions and correction processings to those image signals to improve image quality, such as colors, tone and definition, and reproduction performances, and performs additionally editing processes of the color image data. Further, the image processing system converts the image colors into the toner primary colors Y (yellow), M (magenta), C (cyan), and K (black), converts tone toner signals of the process colors into on/off or binary-coded signals, and outputs those converted signals to the image output terminal 34. In the IOT 34 including a scanner 40 and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/8 lens 40c, and a reflection mirror 40d. The thus formed color image is transferred onto a sheet of paper supplied from the paper tray 35, and is output in the form of a color copy.

In the IOT 34, the photoreceptor belt 41, driven by a drive pulley 41a, is provided. A cleaner 41b, a charger 41c, Y, M, C and K developing units 41d, and a transfer unit 41e are disposed around the photoreceptor belt 41. A transfer device 42 is further provided in connection with the transfer unit 41e. The transfer device 42 nips the sheet of paper supplied through a paper transmission path 35a from the paper tray 35, and is rotated four times (in the case of 4-color full copy) to transfer Y, M, C and K latent images on the sheet of paper. The sheet bearing the four latent images is forwarded through a vacuum transmission unit 43 to a fusing unit 45. After the latent images are fused and fixed on the sheet, the sheet is discharged outside. A single sheet inserter (SSI) 35b allows a user to manually and selectively supply a sheet of paper into the paper transmission path 35a.

The user interface (U/I) 36 allows the user to select desired functions and to instruct the conditions to execute the functions. The U/I 36 includes a color display 51 and a hard control panel 52. Additional use of an infrared touch board 53 enables the user to directly enter instructions with soft buttons on the screen.

The electric-control-board container 33 contains a plurality of control boards for the IIT 32, IOT 34, U/I 36, image processing system, film projector 64, and the like, an MCB board (machine control board) for controlling the operations of the IOT 34, ADF 62, sorter 63, and the like, and an SYS board for controlling all those units.

An electrical system, which contains an image data processing system, of the color copying machine thus constructed will be described with reference to FIGS. 3 and 4.

Figure 3:
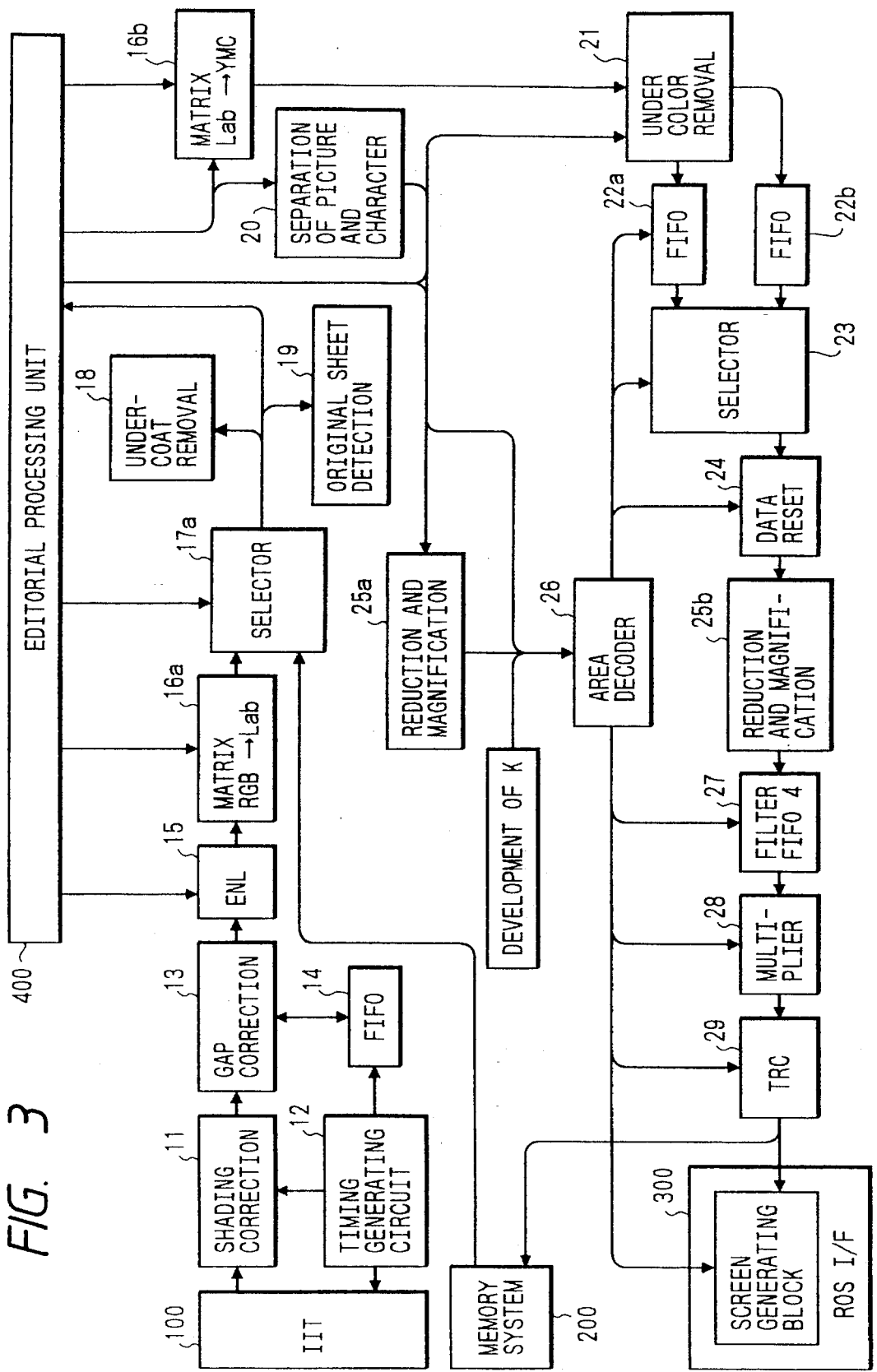
FIG. 3 is a block diagram showing an overall arrangement of a color image processing system contained in the color copying machine illustrated in FIG. 2.

FIG. 3 is a block diagram showing an overall arrangement of the image data processing system for processing image data read by the IIT.

An image input terminal (IIT) 100 contains a size-reduction type sensor which consists of three line sensors of R, G and B arrayed orthogonal to the subsidiary scanning direction. The IIT 100 performs a scanning operation in synchronism with a timing signal from a timing generating circuit 12. The read image data is shading-corrected by a shading correction circuit 11, and applied to a gap correction circuit 13 where gaps among the line sensors are corrected. In the gap correction, the read image data is delayed by the quantities corresponding to the gaps by an FIFO 14 so that the R, G, and B image signals at the same position are obtained at the same time. An ENL (equivalent neutral lightness) 15 is provided for effecting a gray balance. The setting of gray levels in the image signal is inverted every pixel, viz., the negative/positive inversion is performed, by a negative/positive inverting signal from an editorial processing unit 400 to be given later. The ENL 15 may selectively make the negative/positive inversion in only a specific image area. The R, G and B image signals gray-balanced are converted into L, a and b image signals in a matrix circuit 16a under control of control signals from the editorial processing unit 400 (it is evident that $L^*$, $a^*$ and $b^*$ as the standardized L, a and b may be used in place of L, a and b). The conversion of the image signals from R, G and B to L, a and b is performed in order to gain an easy interface with other devices, such as computers. A selector 17, controlled by a signal from the editorial processing unit 400, selects either the output signal of the matrix circuit 16a or the image data from a memory system 200 as an interface with an external computer. An undercoat removal circuit 18, which stores the lowest and highest densities on the original through the prescan, removes the pixels having densities lower than a predetermined density, thereby to improve the copy quality of fog-contained documents like news paper. An original sheet detecting circuit 19 detects the boundary between the reverse side of a black platen and the original sheet, whereby it detects the size of the original sheet irrespective of position where the original sheet is placed, if the sheet is oriented exactly in the scanning direction. The L, a and b image signals color-edited by the editorial processing unit 400 are converted into Y, M and C toner color image signals in another matrix circuit 16b. In an under color removal circuit (UCR) 21, a black film or plate is generated and thus Y, M, C, and K color signals are generated. At the same time, the image signals color-edited are applied to a picture/character separating circuit 20 which then decides whether or not the content of the image data is color characters, black characters or a picture pattern. In the UCR 21, according to character data or a picture pattern, a hue signal and process color signals Y, M, C and K are temporarily stored into FIFOs 22a and 22b. Those signals are selectively read out of the FIFOs by another selector 23. When the image data is black characters, a data reset circuit 24 resets the color data of Y, M and C. When the image data is color characters or a picture pattern, the data reset circuit 24 allows the image data to pass therethrough as it is. A reduction/magnification circuit 25a is provided in order to keep relative positions of a color editing area and a normal copy area during the reduction or magnification process. The reduction/magnification data is decoded by an area decoder 26 and supplied to respective processing portions. The image data reduced or magnified by another reduction/magnification circuit 25b is passed through a filter 27. In the filter, the image data is subjected to the processings for moire removal and edge emphasis. In a multiplier 28, the coefficients of the respective color components are properly selected to adjust colors and densities of color and black characters, and picture patterns. A TRC 29 is provided for adjusting the density according to the characteristic of the IOT. The image data is stored in the memory system 200 or output in the form of an image in an ROS 300.

Figure 4:
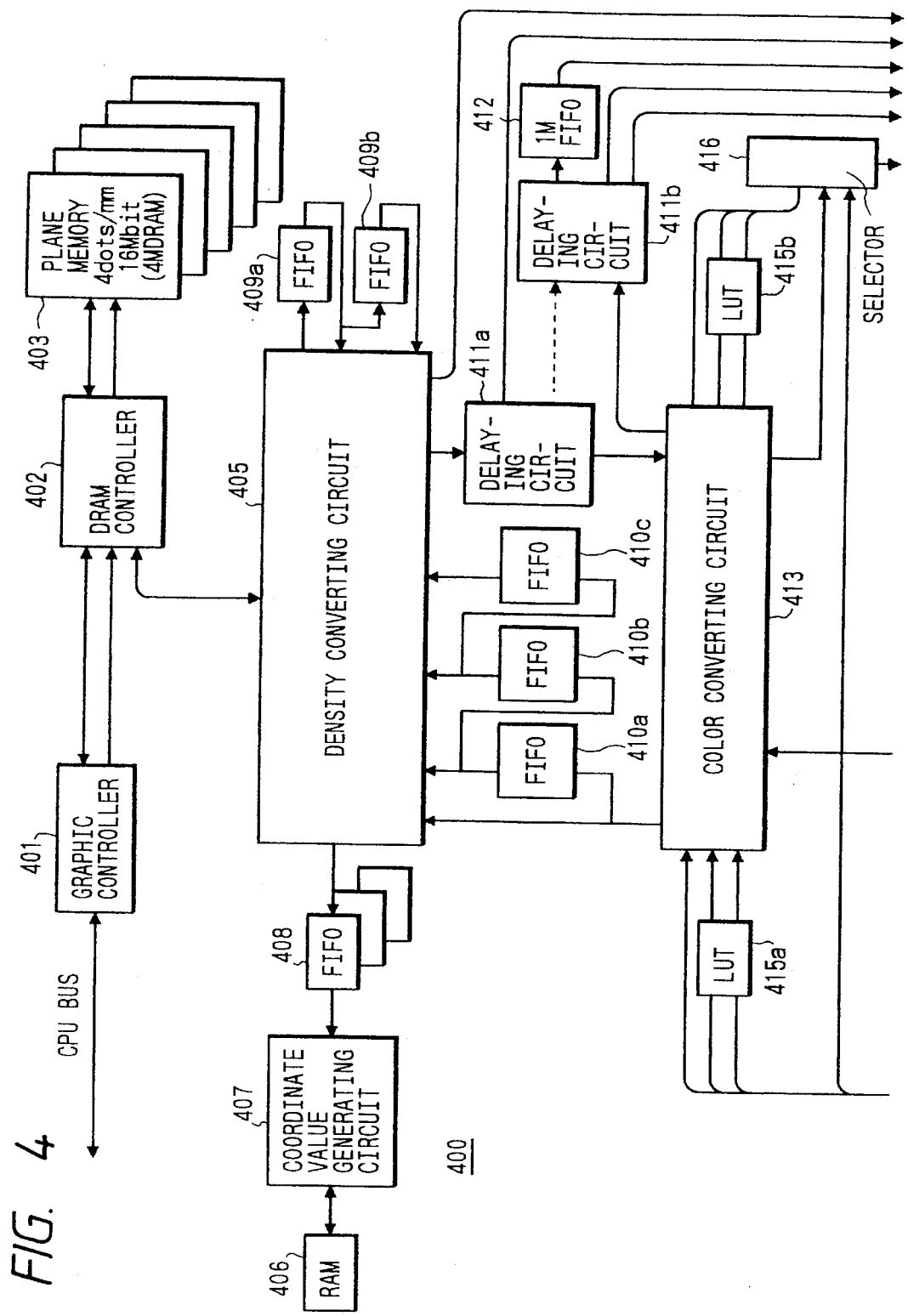
FIG. 4 is a block diagram showing an arrangement for an editing process of the image data.

FIG. 4 is a block diagram showing the overall arrangement for the editing process of the image data.

The editorial processing unit 400 is provided for color editing and area generation. In an LUT 415a, the L, a and b image signals from the selector 17 are converted into L, C and H image signals, in order to provide easy color editing and color conversion. Further, the image data of 24 bits is converted into the image data of 20 bits in order to reduce the memory capacity of a color converting circuit 413. In the color converting circuit 413, colors used for color editing are contained on 32 kinds of palettes. Only the image data in an area in which the color conversion is made is input to the color converting circuit 413. The image data in the remaining area is forwarded directly to a selector 416 and then to the matrix circuit 16b. The color changed L, C and H image data signals are converted again, by an LUT 415b, into L, a and b image signals, and returned to the 24-bit image data which in turn is forwarded to the selector 416. Marker color signals (of three colors) and a closed area signal of 4 bits, that are output from the color converting circuit 413, are forwarded to a density converting circuit 405. At this time, by using FIFOs 410a, 410b and 410c, with a 4×4 window, the image data is binarized in such a manner that if more than a predetermined number of black pixels are contained in the sixteen (16) pixels, "1" is assigned to the image data. Through the binarizing process, the image density is converted from 400 spi to 100 spi. Marker signals (of closed loop and marker dots) thus generated in the density converting circuit 405 are stored into a plane memory 403. To prevent dusty particles from being detected as the marker, the marker dot signal is delayed by the quantity of nine (9) lines by means of an FIFO 408. With a 9 ×9 window, marker dots are detected, and the coordinates of the marker dots are generated and stored into a RAM 406. It is to prevent the mistaken detection that the marker dot signals, which are also stored into the plane memory, are thus processed.

The plane memory 403 is provided for generating an area when the color editing is performed. The area may also be written from an editing pad, for example. To be more specific, coordinate data specified on the editing pad is transferred through a CPU bus to a graphic controller 401. With the aid of an address signal from the graphic controller 401, the area is written into the plane memory 403 through a DRAM controller 402. The plane memory 403 consists of four (4) memory planes. Sixteen (16) kinds, 0 to 15, of areas can be generated by reading the area simultaneously from the four plane memories.

In reading the data from the plane memory 403, in order to prevent a closed loop curve from being zigzagged in shape, the density converting circuit 405 delays the image data by the quantity of four lines by means of FIFOs 409a and 409b, and converts the image density from 100 spi to 400 spi through a data interpolation. The color edited data is time-adjusted, by delay circuits 411a and 411b, and a 1MFIFO, with respect to the image data that is read in the IIT.

Figure 5:
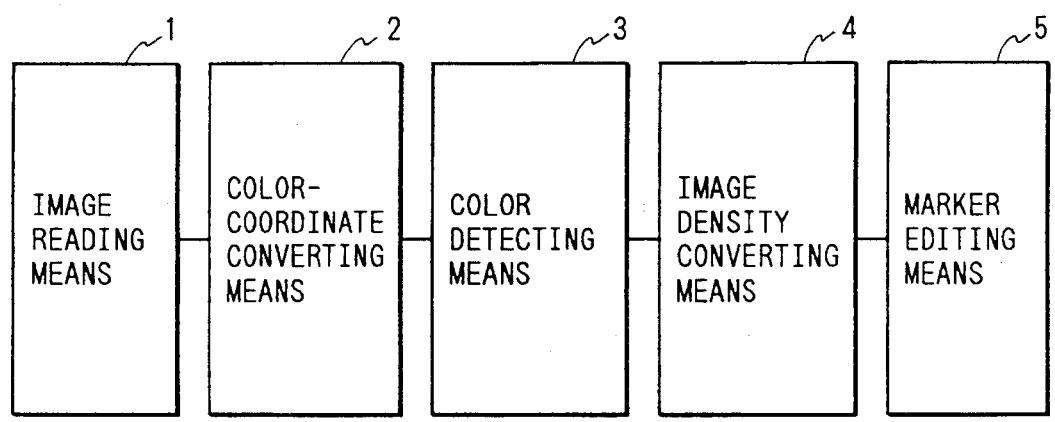
FIG. 5 is a block diagram showing a scheme of a multi-color marker editing system according to an embodiment of the present invention.

An overall construction of a multi-color marker editing system according to an embodiment of the present invention is shown in FIG. 5.

As shown, the multi-color marker editing system comprises an image reading means 1, a color-coordinate converting means 2, a color detecting means 3, an image density converting means 4, and a marker editing means 5.

Color image data of R, G and B that are read by the image reading means 1 are converted into color image data of V (density), H (hue), C (saturation) by the color-coordinate converting means 2. The color-coordinate converting means 2 is constructed with the matrix 16a in FIG. 3, the LUT 415a, and look-up table in the color converting circuit 413 in FIG. 4. The color detecting means 3 detects a marker color designated from among V, H and C signals.

The color detecting means 3 is contained in the color converting circuit 413 in FIG. 4.

Figure 6:
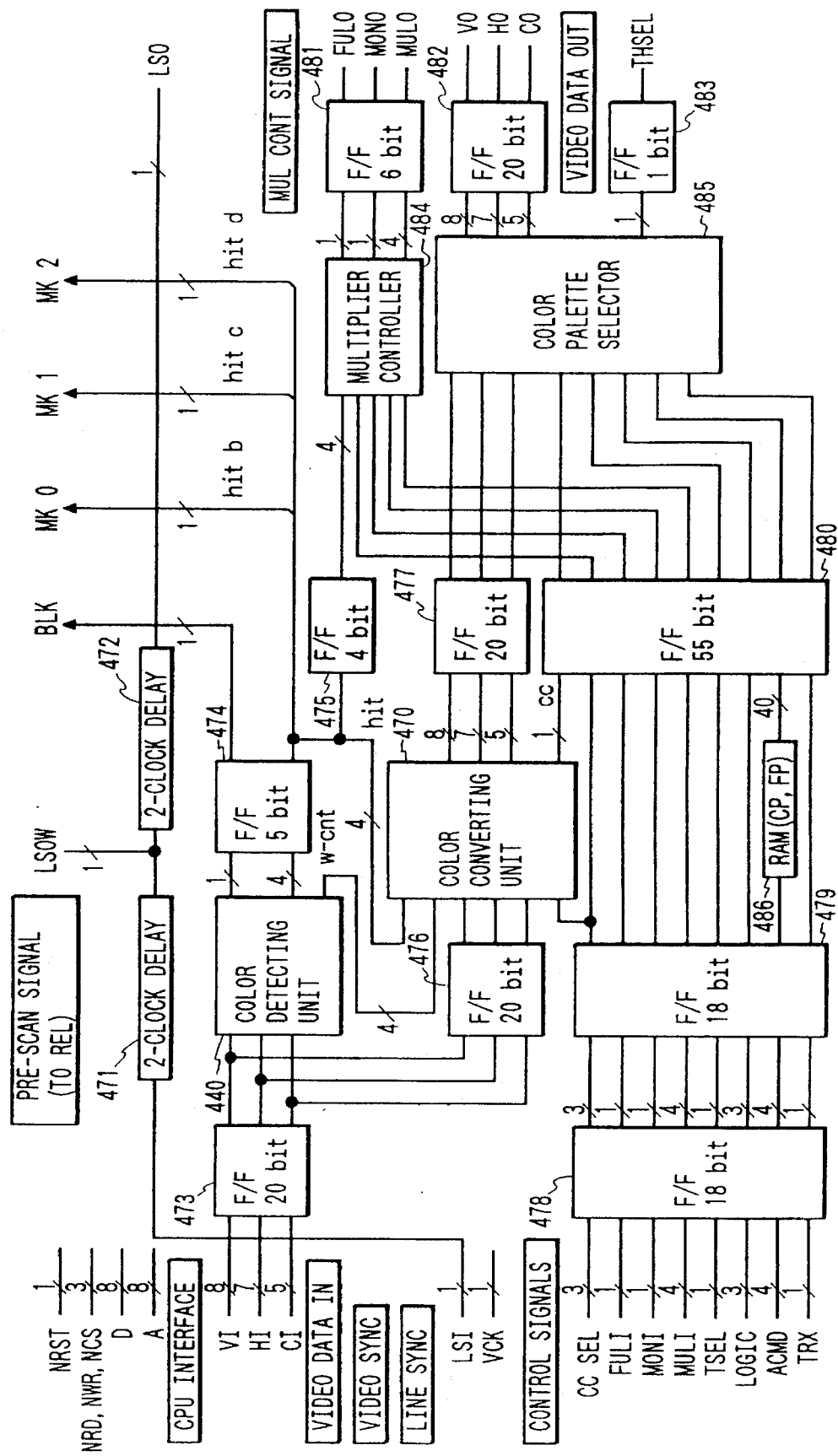
FIG. 6 is a block diagram showing the details of a color converting circuit shown in FIG. 4.

The details of a color processing system of the color converting circuit in FIG. 4 is shown in FIG. 6. Before proceeding with description of this, the color detection and the color conversion will be described in detail with reference to FIGS. 7 and 8.

Figure 7:
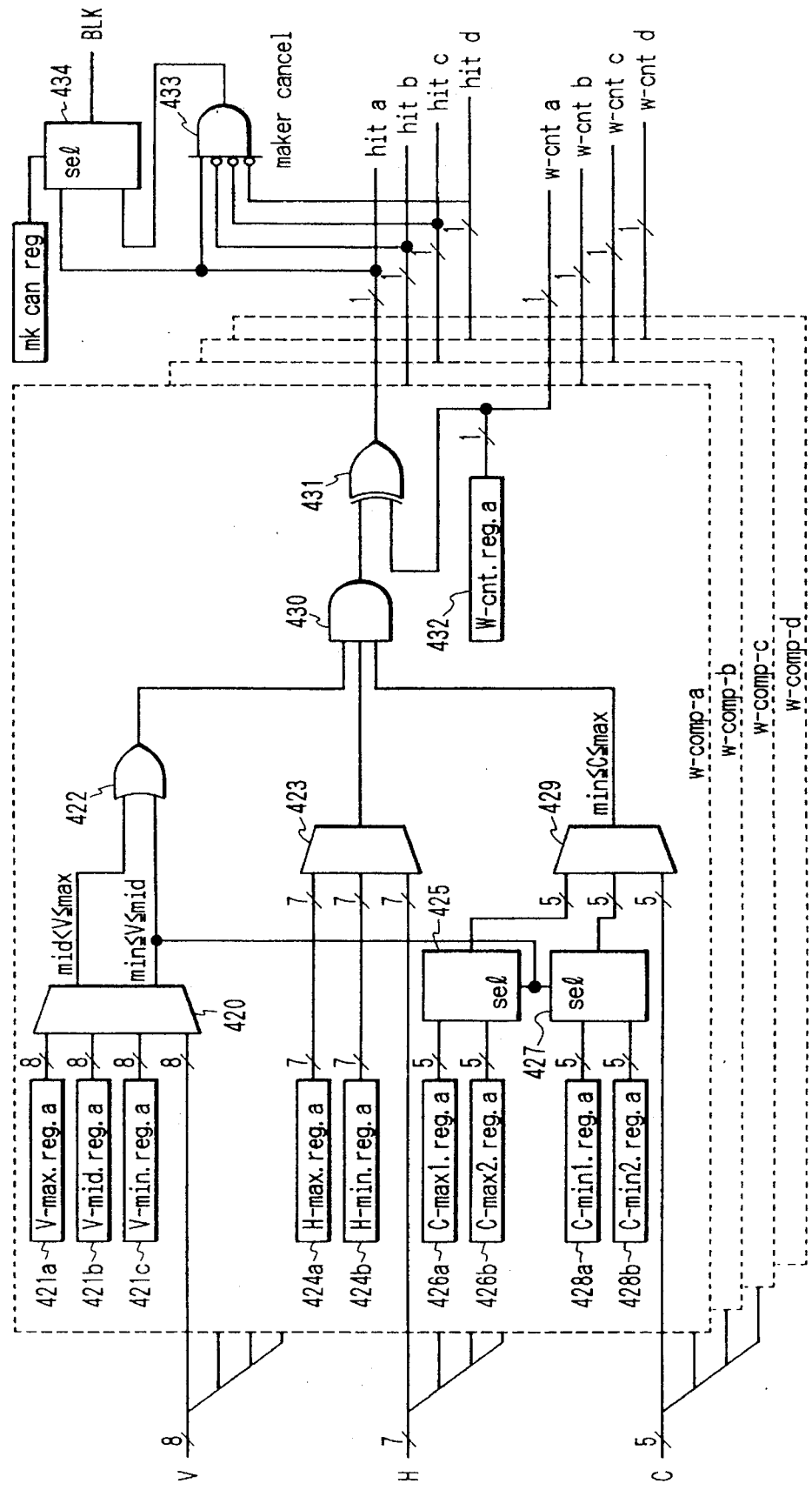
FIG. 7 is a block diagram showing the details of a color detecting unit shown in FIG. 6.

The color detecting means 3 may be expressed in the form of a color detecting unit as shown in FIG. 7.

In FIG. 7, 8-bit data of V, H and C are respectively input to window comparators 420, 423, and 429 where they are compared with predetermined values. The window comparator 420 is coupled at the input with registers 421a to 421c. A maximum density value Vmax and a minimum density value Vmin are set in the registers 421a and 421c, respectively, according to a designated color. A medium density value Vmid is set in the register 421b. The comparator 420 determines whether or not the density V of the read image data falls within the range between the values Vmax and Vmin. When the density V falls within the range, the range is divided into two ranges, $V_{mid} < V \leq V_{max}$ and $V_{min} \leq V \leq V_{mid}$. "1" or "0" is output from two output terminals of the comparator 420 respectively. The result of determination as to whether or not the value V falls within the range between the values Vmax and Vmin is output from an OR circuit 422.

The window comparator 423 is coupled at the input with registers 424a and 424b in which maximum hue data Hmax and minimum hue data Hmin are set according to a designated color. The window comparator 423 determines whether the hue data H is within or outside the range between the hue data Hmax and Hmin. When the hue data H is within the range, the comparator produces data signal of logic "1", and when it is outside the range, the comparator produces data signal of logic "0".

The window comparator 429 follows a combination of a couple of registers 426a and 426b and a selector 425, and another combination of a couple of registers 428a and 428b and a selector 427. The selectors 425 and 427 are switched depending on whether the density data V is in the low or high density region. Two different maximum saturation values Cmax1 and Cmax2 are set in the registers 426a and 426b according to a designated color. Similarly, two different minimum saturation values Cmin1 and Cmin2 are set in the registers 428a and 428b. The maximum values in the registers are switched by the selectors 425. The minimum values in the registers are switched by the selector 427. The maximum and minimum values output from the selectors are compared with saturation data C. If the saturation data is within the range between the maximum and minimum values, the comparator produces a signal of logic "1". If it is outside the range, the comparator produces a signal of logic "0". When the value is in the low density region, the reference value is set to be small, through the switch operation of the set values for saturation data. As a result, even low saturation can be detected.

When the signals of V, H and C thus detected are within the ranges of the values set according to a designated color, an AND circuit 430 produces a signal of logic "1" representing the determination of the designated color. An output signal of the AND circuit 430 is applied to one of the input terminals of an exclusive OR circuit 431 which receives at the other input terminal binary-coded data from a register 432. When logic "0" data is stored in the register 432, the exclusive OR circuit 431 produces a signal of logic "1" when the AND circuit 430 produces a signal of logic "1". When logic "1" data is stored in the register 432, the exclusive OR circuit 431 produces a signal of logic "0" when the AND circuit 430 produces a signal of logic "1". In other words, where "0" is set in the register 432, when the AND circuit 430 determines the received color signal as the designated color signal, the detected color signal is straightforwardly output. Where "1" is set in the register 432, the inverted color signal is output when color signal is determined to be the designated color signal. In this way, it is possible to select the designated color or non-designated color. The output signal of the exclusive OR circuit 431 and a color conversion area signal are ANDed by an AND circuit 433, and when it corresponds to an area generated in the memory plane, it is output as a color detection signal. In this way, the area for color conversion is specified.

When the density V is in the low density region, and the value set in the saturation register is small, viz., the saturation is small, the hue may be treated as "don't care" in software. In the vicinity of gray, the color different based on the hue is extremely small. Therefore, it is improper to discriminate colors through a simple window comparison. In this case, when the saturation C is below a predetermined level, it is detected as black.

The color detecting circuits thus arranged are provided for black, red, blue and green, respectively, and produce hit signals (color detection signals) of black, red, blue and green, denoted as hita, hitb, hitc, and hitd. These signals hitb, hitc, and hitd correspond to signals MK0, MK1, and MK2, respectively. The values w-cnta, w-cntb, w-cntc, and w-cntd, which are used for color conversion, are output from the registers 432 for the respective colors. A black signal (BLK), output from the selector 434, may be mistaken as part of red, blue, and green. To cope with this, the BLK signal is permitted to be output only when the AND circuit 433 produces "1000" for black, red, blue, and green. With this, the part of other colors than black will not be mistakenly recognized as black.

Figure 8:
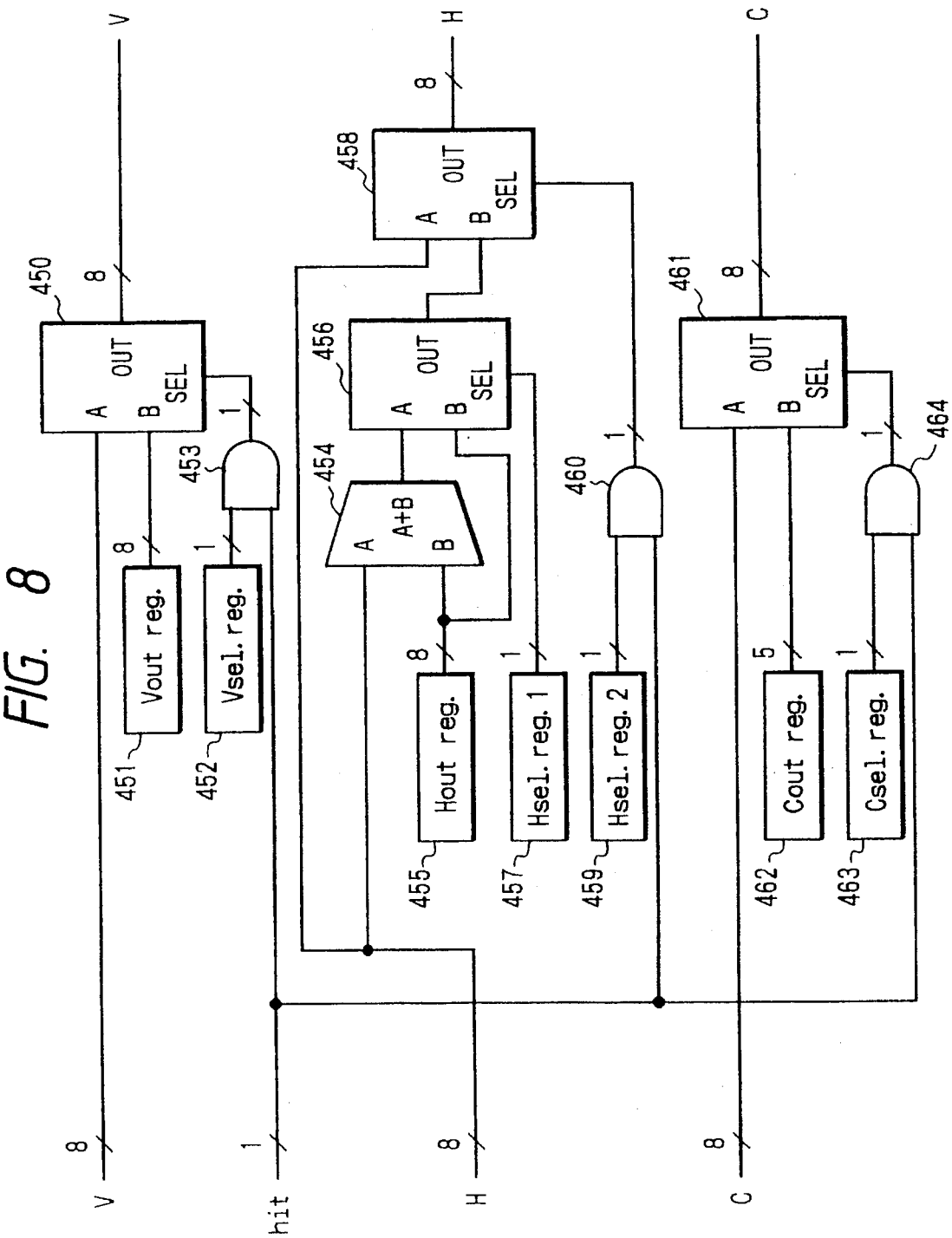
FIG. 8 is a block diagram showing the details of a color converting unit shown in FIG. 6.

The color converting means may be electrically depicted as a color converting unit as shown in FIG. 8. Actually, the color converting units as shown are provided for the four colors, black, red, blue, and green, respectively. In the description to follow, one of them will be typically given.

In the circuit of FIG. 8, a hit signal corresponds to the color detection signal in FIG. 7. An AND circuit 453 logically multiplies the color detection signal and a select value set in a register 452. An AND circuit 460 logically multiplies the color detection signal and a select value set in a register 459. An AND circuit 464 logically multiplies the color detection signal and a select value set in a register 463. The output signals of those AND circuits are used as select signals for selectors 450, 458, and 461. When the AND circuits produce signals of logic "0", input signals, i.e., video signals of V, H, and C, which are input to the input terminals A of the selectors 450, 458, and 461, are selected. When the output signals of the AND circuits are logic "1", input signals, i.e., the output signals of the registers 451, selector 456, and register 462, which are input to the input terminals B, are selected. The register 451, which is selected by the selector 450, stores a density value of the converted color. When the select set value of the register 452 is logic "1", a detected density value V or the conversion color is set according to the color detection signal. When the color detect signal is logic "1", the designated color portion is converted into the set density value of the register 451. When it is logic "0", the color areas other than the designated color portion are not converted and the density or value V is output as it is. When the select set value of the register 452 is "0", the AND circuit 453 produces a "0" signal irrespective of presence of the color detection signal. Thus, the detected value V is always selected, while no color conversion is carried out.

Hue data H is applied to an adder/subtractor 454 where it is added to or subtracted from the output signal of a register 455 storing the hue data after color conversion. Usually, when a color is designated by using an editing pad, the color is detected by pointing out only one point in an area. If this color is perfectly converted to a color to be changed, problems arise. For example, when the color of an apple whose hue is slightly different in places is changed to orange color, the apple color is uniformly changed into the orange color of a lemon. To avoid this defect, the color after conversion and the hue data H are processed by the adder/subtractor 454 so that the hue value detected is left and hence the hue information slightly different in places is left. In an example case where the hue of the apple ranges from 80 to 120 as its numerical value, the hue at the color designated point is 100, and the hue of the lemon is 150, if the numerical value 50 is set in the register 455, the hue after the addition is 130 to 170. The figures indicate that the hue varying with place is secured after color conversion. In the color converting circuit, the selector 456 is provided to select the output signal of the adder/subtractor 454 or the output signal of the register 455. Accordingly, a single color can also be obtained. In the arrangement of the color converting circuit, the read hue data H per se or the output data of the selector 456 can selectively be used at the selector 458. Accordingly, the color converting circuit is capable of selectively producing three types of data, the read hue data H, data obtained after the read hue data H and the hue value after conversion are subjected to the addition/subtraction processing, and hue data after conversion.

The saturation data C is applied to an input terminal A of the selector 461. The register 462, which saturation data after conversion is set, is connected to another input terminal B of the same. With the output signal of the AND circuit 464, which receives the color detection signal and a select value set in a register 463, the selector 461 is switched. When the set value of the register is "1", the detected saturation C and the saturation after conversion are selected according to the color detection signal. When it is "0", the detected saturation C is always selected, and no color conversion is carried out.

For the image data, the color converting circuit thus arranged is able to selectively produce the read image data V, H and C or the image data V, H and C to be converted. For the hue data, it is able to selectively produce the read hue data, the hue data after the read hue and the hue after conversion are subjected to the addition/subtraction processing, or the hue data after conversion. "1" or "0" can be independently set in the registers 452, 457, 459, and 463. Accordingly, the hue can be changed or a monochromatic mode can be set up in the same state, while the density is left as it is. The density and saturation can freely be changed or converted while the hue is left as it is.

Returning to FIG. 6, 20-bit signals V, H and C are input through a flip-flop 473 for timing adjustment to a color detecting unit 440 including window comparators for color detection, and input also to a color converting unit 470, through a flip-flop 476 for timing adjustment.

The color detecting unit 440 produces through a timing-adjustment flip-flop 474 marker signals BLK, MK0, MK1 and MK2. Delay circuits 471 and 472 delay, by two clocks, a line sync signal so as to synchronize with the color detection and color conversion processings, and produces a prescan signal. The same also produces a line sync signal after a further two-clock delay.

A control signal CCSEL is used for selecting one of the four color converting circuits. In control signals FUL1 and MON1 when combined, (00) represents a 3-color mode; (01), a monocolor and black/white mode; (10) and (11), a 4-color mode. A 4-bit control signal MUL1 is used for setting coefficients of a multiplier, which are for color and density adjustments. A control signal TSEL is for designating an image area as a character composition area or a normal copy. The control signal TSEL of logic "1" designates the character composition, and the signal of logic "0" designates the normal copy. A control signal LOGIC is for setting the functions of character coloring, color removal, character composition, and the like. A signal ACMD is an area signal generated by the plane memory. A signal TEX is a 1-bit character signal extracted from the image data. The signal TEX of logic "1" indicates that the area is a character area, and the signal of logic "0" indicates that the area is not the character area.

These control signals are applied to a selector 485 for color palette, through a chain of flip-flops 478, 479, and 480 for timing adjustment. By those control signals, the selector 485 selects a desired palette from a color palette and fore palette of 40-bit data, which are stored in a RAM486, and then produces the selected palette in the form of V, H and C signals. A multiplier controller 484 receives the control signals and color detection signal, and sets up a multi-color mode, a mono-color mode, and the like.

Figure 9A:
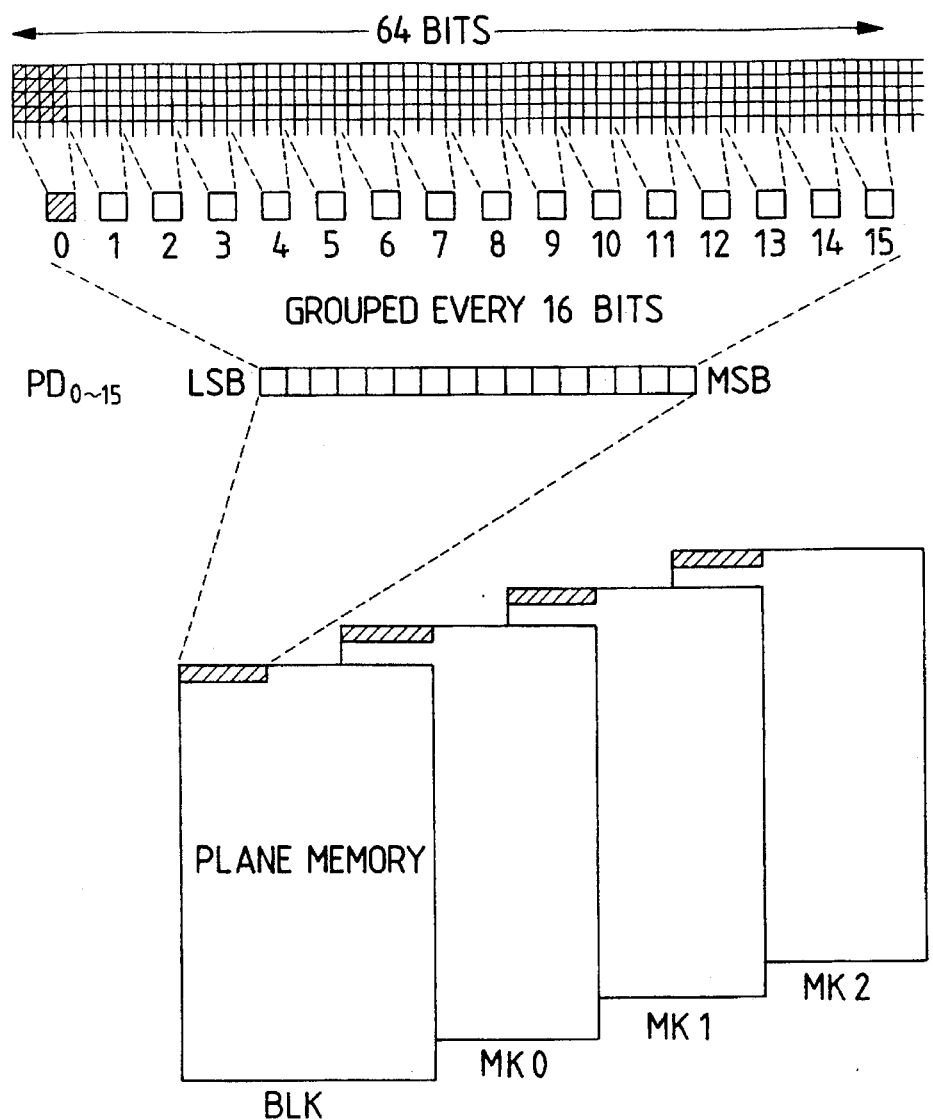
FIGS. 9(a) and 9(b) are explanatory diagrams for explaining an image density converting process.
Figure 9B:
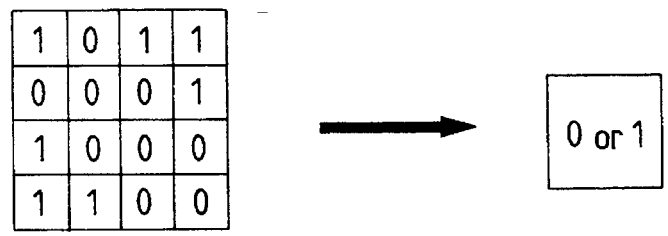

The image density converting means 4 shown in FIG. 5 converts a pixel density of the image data from 400 spi to 100 spi by using the detected marker signal, thereby effecting data compression and removal of ghost and noise. The image density converting means 4 corresponds to the density converting circuit 405 in FIG. 4. The image density converting means 4 compresses data of 16 bits, which consists of 4-bit area and marker color signals and four bits (four lines) internally generated (see FIG. 9(a)), in a manner that 4×4 pixels are compressed into one pixel (FIG. 9(b)). When a predetermined number of pixels of the sixteen pixels are logic "1", the compressed pixel is set to "1". The data compression can remove color ghost because at most one to two pixels of the color ghost appear, and further can remove noise by dust.

Figure 14:
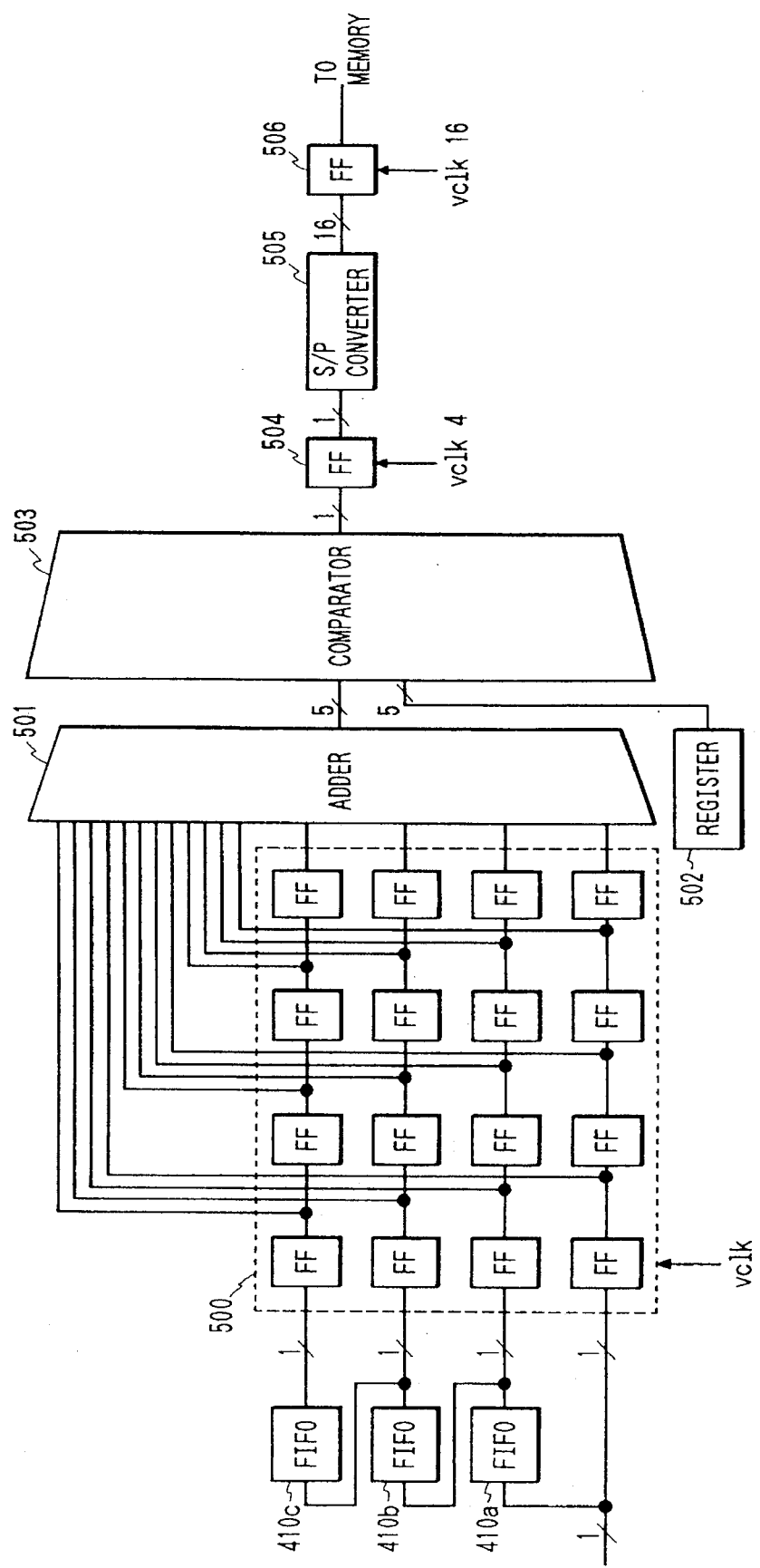
FIG. 14 is a block diagram showing a density converting circuit.

As shown in FIG. 14, the binary-coded data output from the FIFOs 410a to 420c already stated are input to a first flip-flop circuit 500 arrayed in a matrix fashion. In the flip-flop circuit 500, the data is arranged into (4×4) matrix array. The data of matrix array is then applied to an adder 501. In the adder, "1" is added to the data. The output data of the flip-flop circuit 500 is transferred in synchronism with a reference clock signal vclk. The output data of the adder 501 is compared with a threshold value prestored in a register 502 by a comparator 503. The output data of the comparator 503 is transferred to a serial/parallel converter 505 through a second flip-flop circuit 504. The second flip-flop circuit 504 is driven by a clock signal vclk4 of which the period is four times as long as the reference clock signal vclk. The data is grouped every 16 bits by the serial/parallel converter 505, and is transferred through a third flip-flop circuit 506 to a plane memory. The third flip-flop circuit 506 is driven by a clock signal vclk16 of which the period is sixteen times as long as the reference clock signal vclk.

Figure 10A:
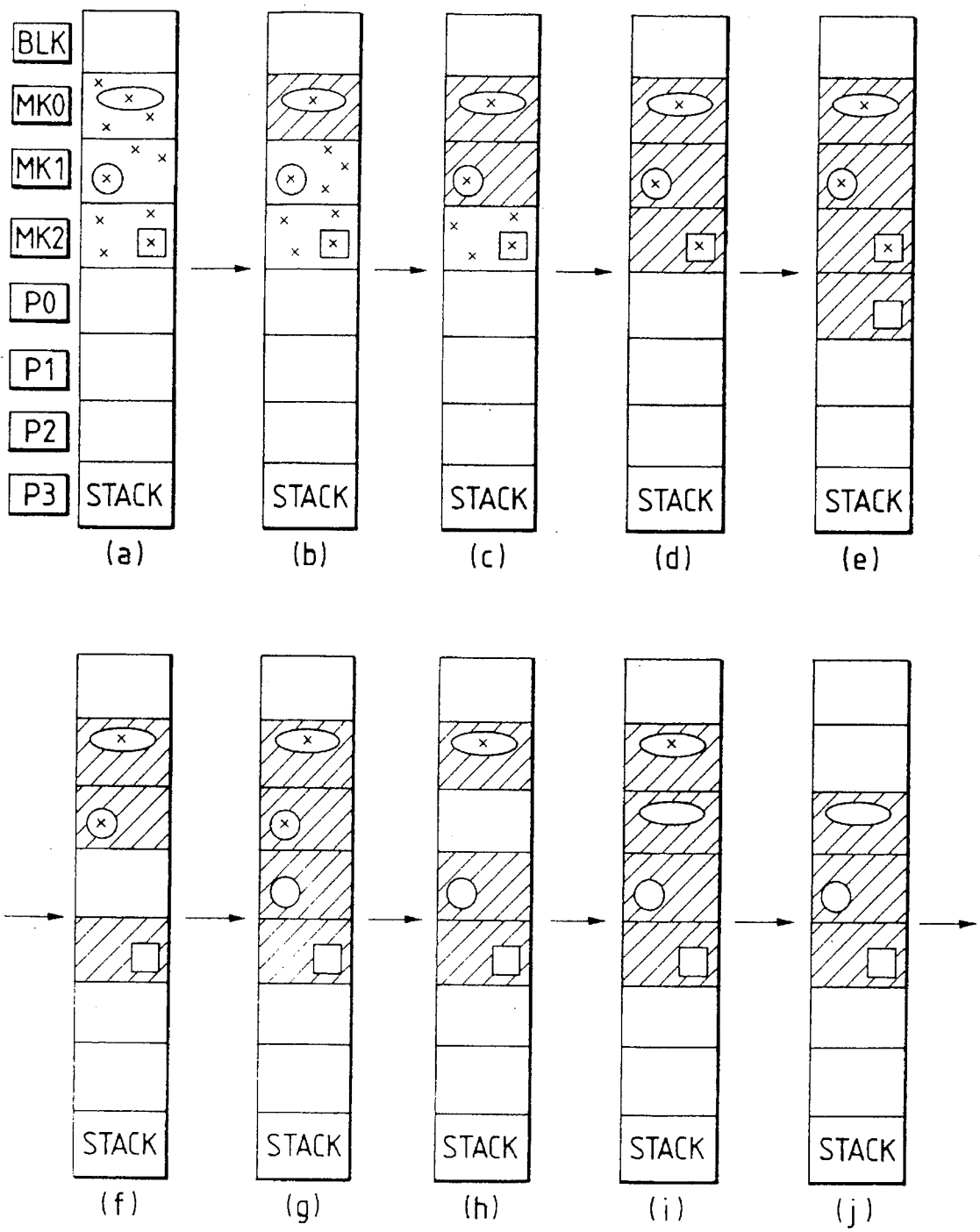
FIGS. 10A and 10B are explanatory diagrams for explaining processings performed in a plane memory.
Figure 10B:
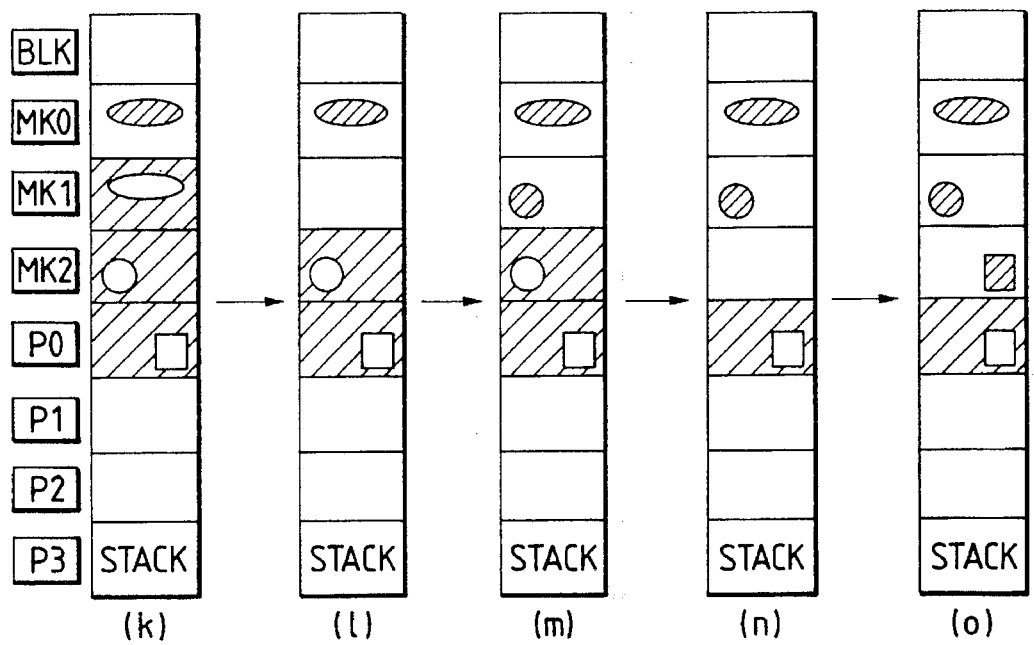
Figure 10B:
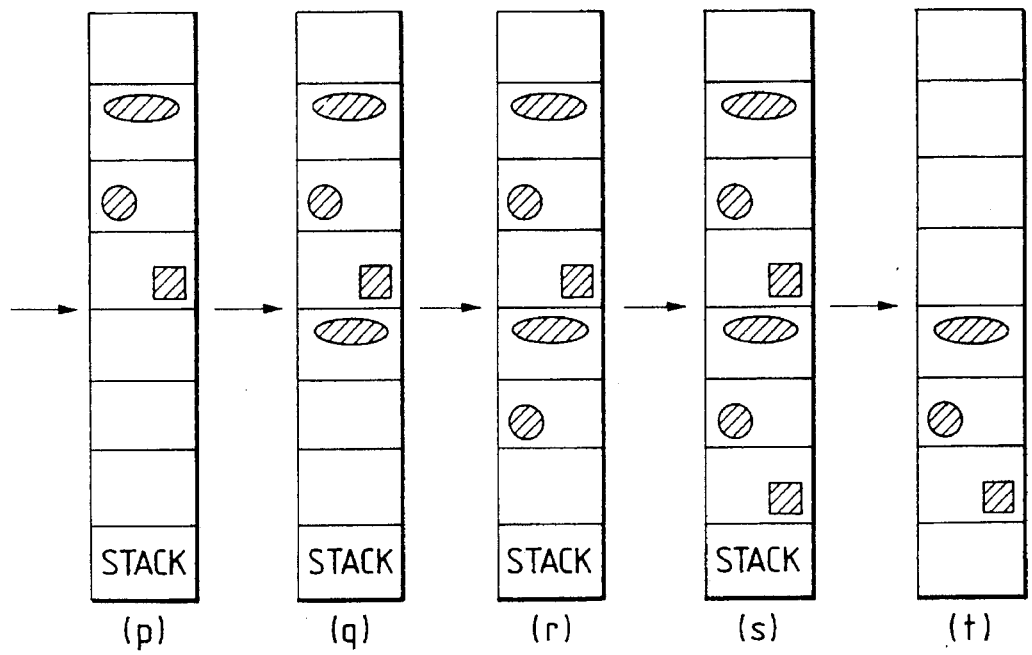

The pixels thus obtained are divided into 16-bit groups, and binarized. The resultant black image is stored into a plane memory of BLK. Similarly, the red image (place where looks red), the blue image, and the green image are respectively stored into the plane memories MK0, MK1, and MK2. The marker editing means 5 in FIG. 5 performs a marker editing process by using the data thus obtained. The plane memory contains four memory planes for storing data. Actually, read-only memory planes P0, P1, P2, and P3 are additionally provided as shown in FIGS. 10A and 10B. Consequently, the plane memory contains totally eight memory planes.

It is assumed now that marker data as shown in FIG. 10A(a) are stored in the memory planes MK0, MK1, and MK2, and noise as indicated by "X" are also stored therein. The DRAM controller 402 in FIG. 4 paints out the whole area of the memory plane MK0 except the marker area, with bits "1's", starting from a start point for drawing. Subsequently, as shown in FIGS. 10A(c) and 10A(d), the whole areas of the memory planes MK1 and MK2 except the marker areas are painted out with "1", starting from start points for drawing. Through the paint-out processing, the areas other than the markers in the memory planes are completely filled with "1's", eliminating noise. Then, as shown in FIG. 10A(e), the planes MK2 and P0 are painted out, starting from a drawing start point outside the marker of the MK2, and the plane MK2 is cleared as shown in FIG. 10A(f). Similarly, the planes MK1 and MK2 are painted out, starting from a drawing start point outside the marker of the MK1, and the plane MK1 is cleared as shown in FIGS. 10A(g) and 10A(h). A similar processing is applied for the memory plane MK0, whereby a state of the plane memory containing images, as shown in FIG. 10A(j) is established. The sequence of these processings removes the noise in the markers. Thereafter, as shown in FIG. 10B(k), the plane MK1 is inverted and copied in the plane MK0, and the plane MK1 is cleared (FIG. 10B(l)). The processing subsequently is applied for the planes MK2 and P0 (FIGS. 10B(m) to 10B(o)), thereby gaining images with the painted-out marker areas as shown in FIG. 10B(p). To read these images, the images are copied into the memory planes P0, P1, and P2 (FIGS. 10B(q), 10B(r), and 10B(s)). Finally, the memory planes MK0, MK1, and MK2, and the stack are cleared, thereby gaining area image data as shown in FIG. 10B(t). The stack plane is provided for temporarily storing data when the copying operation is carried out. After that operation is completed, the stack is cleared. In this way, the area signals free from ghost and noise can be formed.

The editorial processings, such as paint-out, copy, inversion copy, and deletion, in the plane memory can be executed by using various commands provided for the same purposes, which are used in AGDCII Graphic Controller, made by Nippon Electric Co., Ltd.

Figure 11:
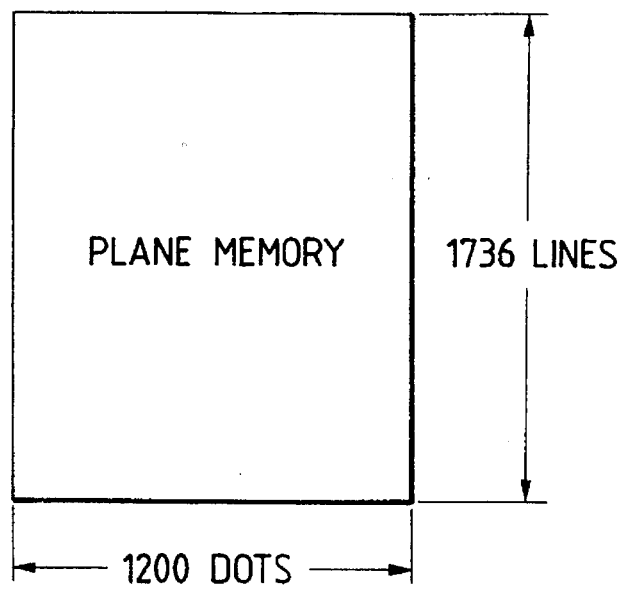
FIG. 11 is an explanatory diagram for explaining a search processing in a plane memory.

When the processing is executed depending on only the plane memory irrespective of presence or absence of marker loops, the processings as stated above must be executed also when the marker is absent. Such processings are idle. To cope with this, as shown in FIG. 11, the 0th dot to 1200th dot (corresponding to A3 size) are searched in the area ranging from 0th line to 1736th line of the plane memory. If the area between a search start position and a search end position is filled with "0's", control decides that no dot is present in the area. If not so, control decides that the dot or dots are present, and subsequently performs the marker editing process. Thus, the processing on the plane memory having no marker is omitted, so that the editing process is reduced as a whole.

Figure 12A:
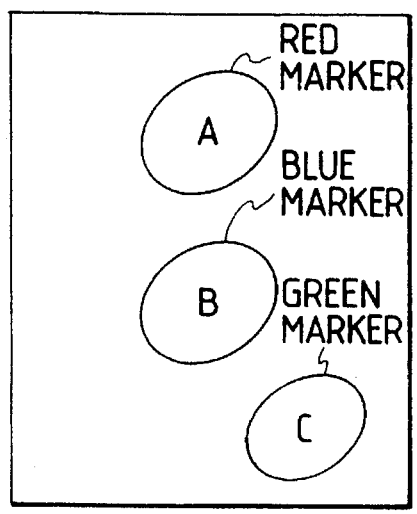
FIGS. 12(a) and 12(b) are explanatory diagrams for explaining a color converting operation for multi-color markers.
Figure 12B:
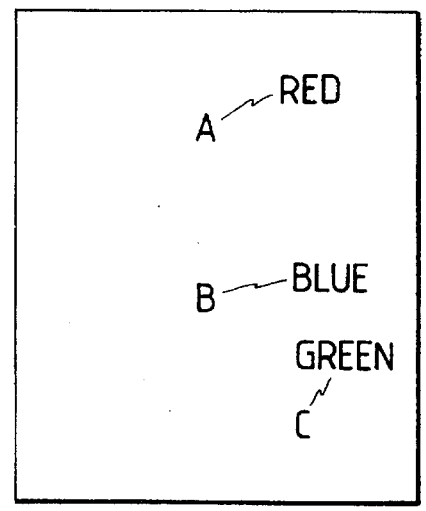

In a case that characters A, B, and C are respectively enclosed by red, blue and green markers, as shown in FIG. 12(a), the processings of image data as stated above produce color images of red A, blue B, and green C, as shown in FIG. 12(b).

The area designation dots are processed by a coordinate value generating circuit 407 in FIG. 4. In an example of a dot matrix of 9×9 where central four pixels are all "1's", and the remaining pixels are all "0's", as shown in FIG. 13(a), the coordinate value generating circuit 407 determines that these are dots by the area designation. In the case of a loop marker, it is hardly possible that the remaining pixels are all "0's". Accordingly, those can be distinguished from the loop marker. If those dots are determined to be the area-designation dots under the condition that the four dots are all "1's", those can be detected while being distinguished from dusty particles. In the plane memory side, the area designation dots are treated as noise, and the area including them is completely painted out to remove all the dots.

When a red dot is attached, by the area designation dot, to one of the blocks forming a table on an original document as shown in FIG. 13(b), the block containing the red dot can be meshed in red color as shown in FIG. 13(c).

As seen from the foregoing description, in the present invention, marker loop data are stored into bit-map memories provided for the respective colors. In the memories, the intended areas are painted out, thereby completely removing color ghost and dust noise. Since the editing process is performed in the memories, multi-color markers can be detected at high accuracy. Also in the processing for image-density conversion, color ghost may be removed, improving marker detection accuracy. When the present invention is applied for a color copying machine, for example, it is possible to edit multi-color loop markers for one time of copying operation.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multi-color marker editing system for editing a color image by reading a designated marker, comprising:

image reading means for reading color image data at a first pixel density;

color-coordinate converting means for converting the read color image data into color image data in a color coordinate system defined by optical density, hue and saturation;

color detecting means for detecting pixels having a designated marker color in the color-coordinate converted color image data and forming a first marker color image having the first pixel density;

image density converting means for converting first marker color image data associated with the first marker color image to second marker color image data having a second pixel density lower than the first pixel density, and for converting the second marker color image data to third marker color image data having the first pixel density, the conversions from the first marker color image data to the third marker color image data by the image density converting means serving to remove ghosts from the first marker color image; and marker editing means for editing said second marker color image data before the second marker color image data is converted to the third marker color image data, wherein said marker editing means edits the second marker color image data so as to fill a first image portion corresponding to a closed area designated by a marker and a second image portion corresponding to an area other than the closed area with data different from each other, thereby removing any ghosts from both the first and second image portions of the second marker color image data.

2. The multi-color marker editing system according to claim 1, wherein the color detecting means sets data indicating that a pixel of the first marker color image is a marker portion when a corresponding pixel of the color-coordinate converted color image data is the designated marker color; and wherein said image density converting means compresses a block of (n×m) (where n and m are positive integers) pixels of said first marker color image data to one pixel, and sets the compressed pixel to data indicating the marker portion, if a number of pixels having said data indicating the marker portion in the (n×m) pixels is larger than a threshold value, thereby effecting the image density conversion from the first marker color image data to the second marker color image data and removing ghosts from the first marker color image.

3. The multi-color marker editing system according to claim 1, wherein said image density converting means interpolates the third marker image data.

4. A device for removal of color ghosts from a color image, said ghost removal device comprising:

image reading means for reading color image data at a first pixel density;

color-coordinate converting meads for converting the read color image data into color image data in a color coordinate system defined by optical density, hue and saturation;

color detecting means for detecting pixels having a designated color in the color-coordinate converted color image data and forming a first color image having the first pixel density;

block generating means for grouping first color image data associated with the first color image having the first pixel density into blocks, each of said blocks including (n ×m) (where n and m are positive integers) pixels;

computing means for computing the number of pixels having a specific color value within each of the pixel blocks;

comparing means for comparing a result of computation by said computing means with a predetermined value; and density converting means for converting each of the pixel blocks to one pixel having a value based on a result of comparison by said comparing means to form second color image data having a second pixel density equal to one (n×m)-th of the first pixel density, and converting the second color image data to third color image data having the first pixel density, and thereby effecting ghost removal from the first color image.

5. A multi-color marker editing system for editing a color image by a designated marker comprising:

image reading means for reading color image data at a first pixel density;

color-coordinate converting means for converting the read color image data into color image data in a color coordinate system defined by optical density, hue and saturation;

color detecting means for detecting pixels having a designated marker color in the color-coordinate converted color image data and forming a first marker color image having the first pixel density, the color detecting means sets data indicating that a pixel of the first marker color image is a marker portion when a corresponding pixel of the color-coordinate converted color image data is the designated marker color;

image density converting means for converting first marker color image data associated with the first marker color image to second marker color image data having a second pixel density lower than the first pixel density, and for converting the second marker color image data to a third marker color image data having the first pixel density, wherein said image density converting means compresses a block of (n×m) (where n and m are positive integers) pixels of said first marker color image data to one pixel, and sets the compressed pixels to data indicating the marker portion, if a number of pixels having said data indicating the marker portion in the (n×m) pixels is larger than a threshold value, thereby effecting the image density conversion from the first marker color image data to the second marker color image data and removing ghosts from the first marker color image; and marker editing means for editing said second marker color image data before the second marker color image data is converted to the third marker color image data to remove ghosts from the second marker color image data.

6. The multi-color marker editing system according to claim 5, wherein said marker editing means stores the second marker color image data corresponding to a plurality of respective colors into a bit map memory, and removes ghosts inside and outside the closed area designated by said marker.

* * * * *

UNITED STATES PATENT AND TRADEMARK OFFICE
CERTIFICATE OF CORRECTION

PATENT NO. : 5,548,663
DATED : August 20, 1996
INVENTOR(S) : Hiroshi SEKINE et al.

It is certified that error appears in the above-indentified patent and that said Letters Patent is hereby corrected as shown below:

Claim 4, column 12, line 40, "meads" should read --means--.

Signed and Sealed this

Seventeenth Day of December, 1996

Attest:

BRUCE LEHMAN

*Attesting Officer*    *Commissioner of Patents and Trademarks*